July 30, 1935.  C. C. FARMER  2,009,844
ANGLE COCK DEVICE
Filed Dec. 8, 1933  2 Sheets-Sheet 2
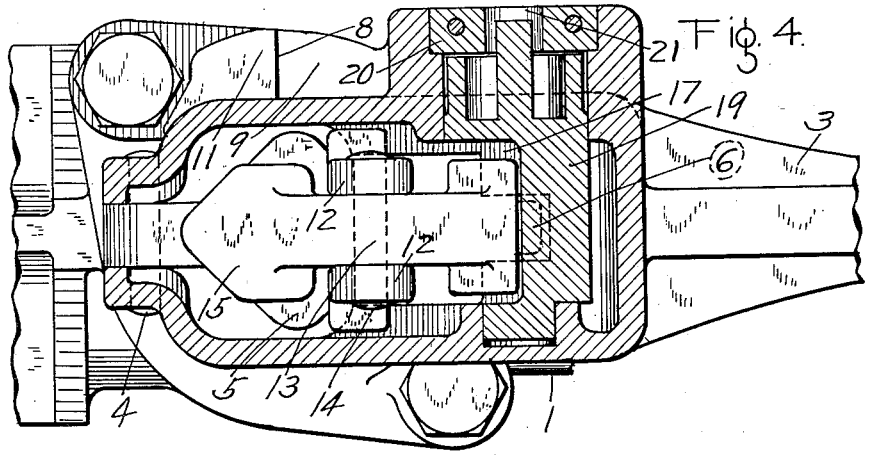
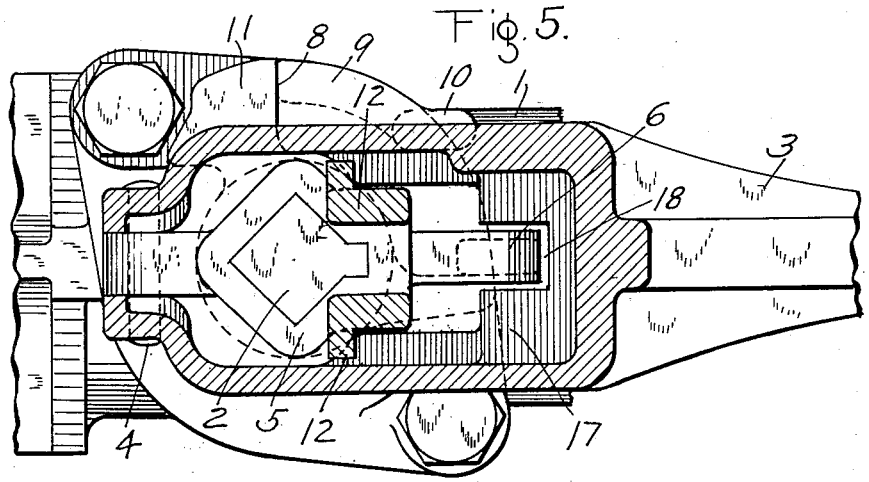
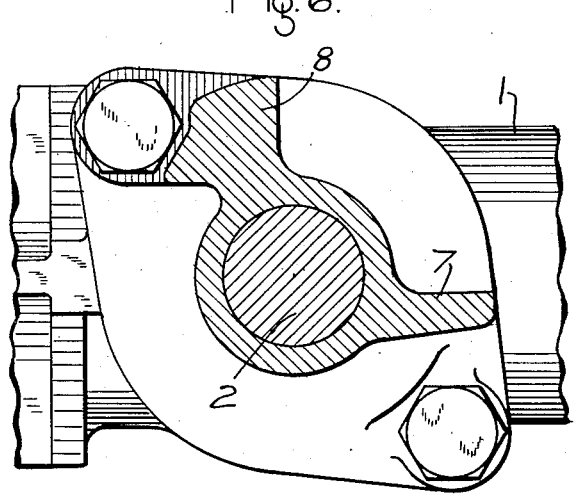
INVENTOR
CLYDE C. FARMER
BY *Wm. M. Cady*
ATTORNEY Patented July 30, 1935

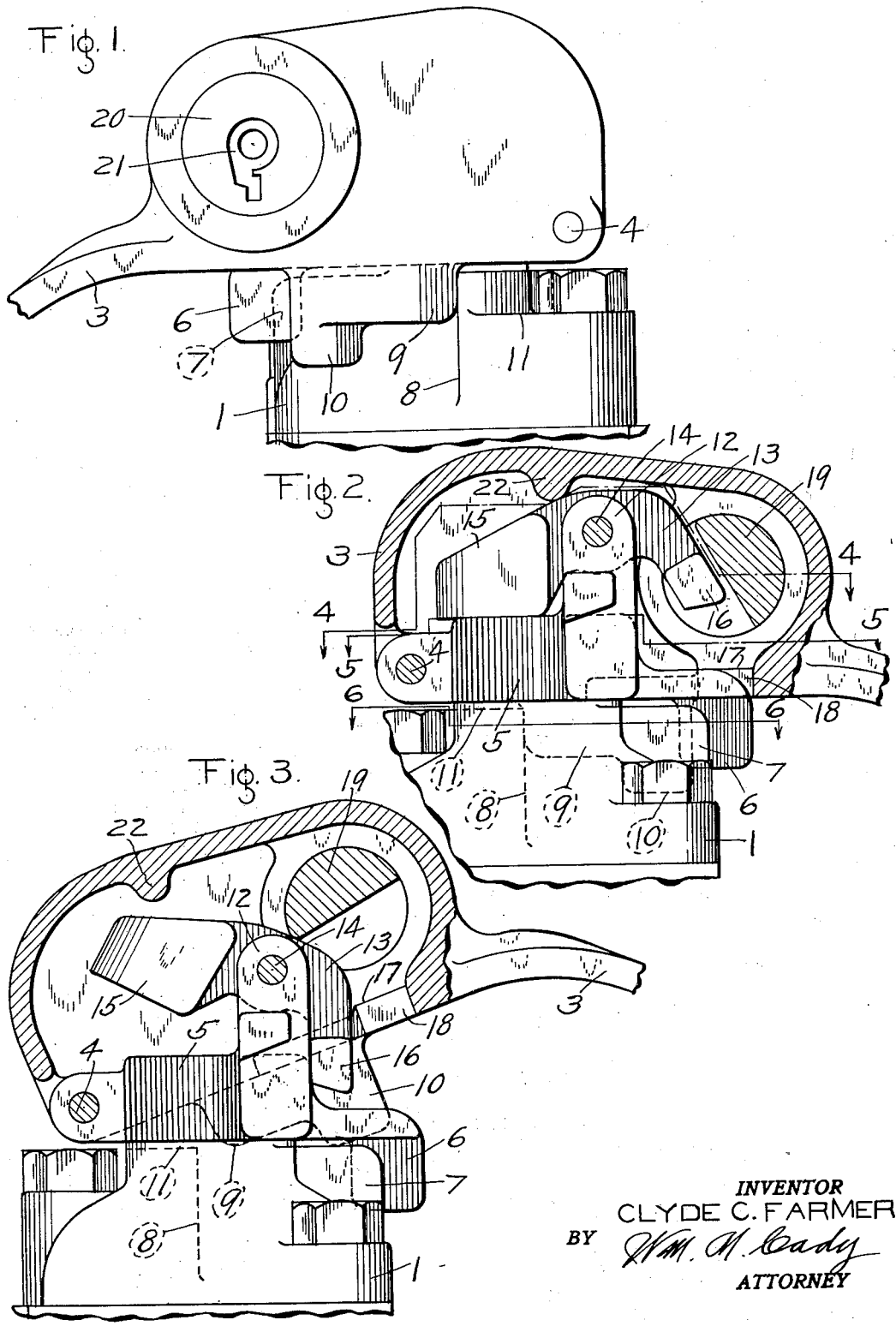

2,009,844

UNITED STATES PATENT OFFICE 2,009,844

ANGLE COCK DEVICE

Clyde C. Farmer, Pittsburgh, Pa., assignor to The Westinghouse Air Brake Company, Wilmerding, Pa., a corporation of Pennsylvania Application December 8, 1933, Serial No. 701,449

17 Claims. (Cl. 70—124)

This invention relates to cocks, and more particularly to a locking angle cock of the type which is adapted to be employed on a railway car for controlling communication through the brake pipe or other fluid pressure train pipe, and in which the operating handle of the cock device is adapted to be locked in open position and a key is required to be operated before the handle can be moved from open position.

The principal object of the invention is to provide a cock having improved means for locking the cock in open position.

In the type of locking angle cock shown in my prior Patent No. 1,447,651, issued March 6, 1923, the operating handle of the angle cock is adapted to be locked in either its open or closed position and a key is required to be operated before the handle can be moved from one position to the other. In this type of angle cock the key cannot be removed until after the handle is locked in either its open or its closed position.

In most cases it has been found to be unnecessary and undesirable to require the use of a key in order to permit the movement of the angle cock handle from its closed position to its open position, and another object of the invention is to provide a key controlled angle cock device which will not lock in the closed position of the angle cock, so that the angle cock handle may be moved to its open position without requiring the use of a key.

Another object of the invention is to provide means for holding the operating handle of an angle cock device in a raised position when the angle cock is closed, so as to act as a semaphore to indicate that the angle cock is in its closed position, and a further feature resides in the arrangement of the locking means whereby the operating key may be removed from the angle cock when the handle is in its closed position.

According to the invention the improved locking means comprises a locking bolt which is intended to automatically move into locking relation with the handle of the angle cock device upon movement of the handle from its closed position to its open position and the subsequent release of the handle by the operator, but anticipating the possibility of the failure of the bolt to move to its locking position; a still further feature of the invention resides in the arrangement of the locking bolt whereby the operating handle, when it is released by the operator in cock open position, will act to positively move the locking bolt into locking relation with the handle.

Other objects and advantages will appear in the following more detailed description of the invention.

In the accompanying drawings, Fig. 1 is a side view of a locking angle cock device embodying the invention, with the handle in the cock open position; Fig. 2 is a side view of the angle cock shown in Fig. 1, in part section, and facing in the opposite direction, the locking mechanism being shown in handle locked position; Fig. 3 is a view similar to Fig. 2 and shows the locking mechanism in handle unlocked position; and Figs. 4, 5 and 6 are sectional views taken on the lines 4—4, 5—5 and 6—6 respectively of Fig. 2.

As shown in the drawings, the angle cock device may comprise the cock body 1 in which the usual plug valve (not shown) is rotatably mounted, said plug valve being operated through the medium of the usual valve stem 2 which is rotatably mounted in the cock body. The angle cock device also comprises an operating handle 3.

The handle 3 is pivoted, by means of a pin 4, to a member 5 which is secured to the valve stem 2. The member 5 is provided with a lug 6 adapted to engage stops 7 and 8 in the cock body 1 when the valve stem is turned to its respective open and closed positions.

The handle 3 is provided with a depending lug 9 adapted to engage the stop 8 when the lug 6 of the member 5 engages the stop 7, so as to lock the handle and thereby the member 5, valve stem 2 and plug valve in the open position.

The lug 9, at a point some distance forwardly of the surface which is adapted to engage the stop 8 to lock the handle against movement to its closed position, is provided with a downwardly depending extension 10 which, when the handle 3 is in its closed position, is adapted to engage the upper surface 11 of the stop 8, so as to maintain the handle in a raised position.

The handle 3, being in its raised position when communication through the angle cock is closed, serves as a semaphore to indicate to the trainman that the brake pipe is not open through the angle cock.

The member 5 which is secured to the valve stem is provided with spaced upwardly extending lugs 12, between which there is disposed a locking bolt 13 which is rockably mounted, intermediate its ends, on a pin 14 extending between and carried by the lugs 12. One end of this bolt is made in the form of a weight 15 which is adapted to rest on the upper surface of the member 5 and which tends to maintain the opposite end 16 of the bolt in its locking position, as shown in Fig. 2.

When, with the bolt 13 in its locking position, the handle 3 is raised from the position in which it is shown in Fig. 2, the end 16 of the latch engages a lug 17 carried by the handle before the lug 9 is moved out of locking engagement with the stop 8, so that the handle 3 and parts adapted to be operated thereby cannot be moved from their open position.

The lug 17 on the handle 3 is provided with a notch 18 which is adapted to accommodate the lug 6 of the member 5 when the handle is in its open position, as shown in Fig. 2.

The inner end of the handle 3 is made in the form of a hood which encloses the locking bolt 13, and has rotatably mounted therein, adjacent the end 16 of the bolt, a bolt operating member 19 which is held in place by an escutcheon 20 secured to the hooded portion of the handle. The escutcheon is provided with a key opening 21 which corresponds in shape to the shape of the key to be used. In the present embodiment of the invention the opening is shaped to receive the usual switch key which is carried by an authorized person.

The hooded portion of the handle is provided with an internal lug 22 which, when the handle is in valve open position, engages the upper surface of the bolt 13 at a point to the left of the pivot pin 14, so that the weight of the handle tends to prevent the bolt from vibrating into and out of engagement with the member 5, and thus prevents the bolt from chattering under the usual train operating conditions. This lug 22 also serves another purpose, namely, the positive movement of the bolt 13 to its locking position if for any reason the bolt fails to automatically move to its locking position when the handle 3 moves from its upper position as shown in Fig. 3, to its lower position as shown in Fig. 1.

In order to turn the handle 3 to its valve open position, it is necessary to first lift the same so as to disengage the lug 9 from the stop 8.

With the locking bolt 13 in its locking position, as shown in Fig. 2, the end 16 thereof will be in the path of travel of the lug 17 on the handle 3, and when the handle is lifted, the lug 17 will be engaged by the end 16 of the bolt before the lug 9 on the handle is moved out of locking engagement with the stop 8, so that the handle cannot be turned from its valve open position.

If it is desired to close the valve of the angle cock device, a key, corresponding in shape with the contour of the key opening 21 in the escutcheon 20, must be inserted in the bolt operating member 19 and then turned in a clockwise direction. This causes the member 19 to be turned in the same direction, and the member in turn rocks the bolt 13 in a counter-clockwise direction. The rotation of the member 19 is continued until the bolt comes to a stop against the bolt supporting lugs 12, as shown in Fig. 3. With the bolt in this position, the end 16 thereof is out of the path of travel of the lug 17 of the handle 3 and therefore no longer prevents the handle from being raised to the position in which it shown in Fig. 3.

With the locking bolt in its handle unlocked position, the operator continues to exert force on the key and lifts the handle to the position in which it is shown in Fig. 3. In this position, the lug 9 of the handle is out of locking engagement with the stop 8. The handle is now turned to valve closed position in which the lug 6 of the member 5 engages the stop 8 and the extension 10 of the lug 9 rests on the upper surface of the stop 8.

Since the handle is supported in its raised position by the stop 8, the lug 17, which is some distance above the locking end of the bolt 13, will prevent the bolt 13 from being rocked by the force of gravity to its handle locking position, so that the bolt operating member 19 may be returned to the position in which it is shown in Fig. 2 and the key removed.

Now when it is desired to move the parts to their valve open position, the handle 3 is turned from its closed position to its open position and is then permitted to move, by the force of gravity, from the position in which it is shown in Fig. 3, to the position in which it is shown in Fig. 2. When, during this movement of the handle, the lug 17 passes the end 16 of the bolt 13, said bolt will be moved, by the force of gravity, into locking relation with the lug 17, as shown in Fig. 2. With the handle in its lower position, the lug 9 of the handle engages the stop 8 and prevents the handle from being turned from valve open position, and since the locking bolt is in locking position, the handle cannot be lifted high enough to effect the disengagement of the lug 9 from the stop 8 and the angle cock device is, therefore, locked in open position until unlocked by the use of a key.

If, when the handle is moving to its lower position, the locking bolt 13 should for any reason tend to remain in its unlocking position, the handle will engage and positively move the bolt to its locking position.

The above described construction prevents the movement of the angle cock handle from its valve open position, except by a person provided with the proper key, and it is intended that the trainman in charge of the train shall keep possession of the key and be held responsible for the same. This construction also provides for the removal of the operating key when the handle is in valve closed position and also insures the automatic locking of the handle when the handle is turned to its valve open position and released by an operator.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a cock device having a rotatable valve stem, a handle for rotating the valve stem and a stop adapted to be engaged by the handle to lock the handle against movement to rotate the valve stem, said handle being movable in one direction out of locking engagement with the stop, of means separate from the handle adapted to engage the handle to prevent the handle from being moved out of locking engagement with the stop and being movable to a position for permitting the handle to be moved out of locking engagement with the stop, means for moving the first mentioned means to the last mentioned position, and means for effecting the automatic movement of the first mentioned means into locking engagement with the handle as the handle is returned to its stop engaging position.

2. The combination with a cock device having a rotatable valve stem, a handle for rotating the valve stem and a stop adapted to be engaged by the handle to lock the handle against movement to rotate the valve stem, said handle being movable in one direction out of locking engagement with the stop and being movable in the opposite direction into locking engagement with the stop, of means adapted to engage said handle to prevent the handle from being moved out of locking engagement with the stop and being movable to a position for permitting the handle to be moved out of locking engagement with the stop, and means for moving the first mentioned means to the last mentioned position, the first mentioned means being automatically movable to handle engaging position upon movement of the handle into locking engagement with the stop.

3. The combination with a cock device having a rotatable valve stem, a handle for rotating the valve stem and a stop adapted to be engaged by the handle to lock the handle against movement to rotate the valve stem, said handle being movable in one direction out of locking engagement with the stop, of means separate from and inclosed by said handle adapted to engage the handle to prevent the handle from being moved out of locking engagement with the stop and being movable to a position for permitting the handle to be moved out of locking engagement with the stop, key actuated means for moving said means to the last mentioned position, and means for effecting the automatic movement of the first mentioned means in locking engagement with the handle as the handle is returned to its stop engaging position.

4. The combination with a cock device having a rotatable valve stem, a handle for rotating the valve stem and a stop adapted to be engaged by the handle to lock the handle against movement to rotate the valve stem, said handle being movable in one direction out of locking engagement with the stop, of means separate from said handle carried by the valve stem and enclosed by the handle adapted to engage the handle to prevent the handle from being moved out of locking engagement with the stop and being movable to a position for permitting the handle to be moved out of locking engagement with the stop, key actuated means for moving said means to the last mentioned position, and means for effecting the automatic movement of the first mentioned means into locking engagement with the handle as the handle is returned to its stop engaging position.

5. The combination with a cock device having a rotatable valve stem, a handle for rotating the valve stem and a stop adapted to be engaged by the handle to lock the handle against movement to rotate the valve stem, said handle being movable in one direction out of locking engagement with the stop, of a pivoted member adapted to engage the handle to prevent the handle from being moved out of locking engagement with the stop and being rockable on its pivot to a position out of locking relation with respect to the handle, and means for rocking the pivoted member to the last mentioned position.

6. The combination with a cock device having a rotatable valve stem, a handle for rotating the valve stem and a stop adapted to be engaged by the handle to lock the handle against movement to rotate the valve stem, said handle being movable in one direction out of locking engagement with the stop, of a member secured to the valve stem, a locking bolt pivotally carried by the member and adapted to prevent the handle from being moved out of locking engagement with the stop and being rockable to a position out of locking relation with respect to the handle, and means for rocking the locking bolt to the last mentioned position.

7. The combination with a cock device having a rotatable valve stem, a handle for rotating the valve stem and a stop adapted to be engaged by the handle to lock the handle against movement to rotate the valve stem, said handle being movable in one direction out of locking engagement with the stop, of a lug on said handle, means enclosed by the handle adapted to engage said lug to prevent the handle from being moved out of locking engagement with the stop, and being movable out of engaging position with relation to said lug to permit the handle to be moved out of locking engagement with the stop, and key operated means for moving the first mentioned means out of its lug engaging position.

8. The combination with a cock device having a rotatable valve stem, a handle for rotating the valve stem and a stop adapted to be engaged by the handle to lock the handle against movement to rotate the valve stem, said handle being movable in one direction out of locking engagement with the stop, of a lug on said handle, a member secured to said valve stem, a locking bolt pivotally carried by said member and enclosed by said handle adapted to engage said lug to prevent the handle from being moved out of locking engagement with the stop and movable to a position out of the path of travel of the lug to permit the handle to be moved out of locking engagement with the stop, and means carried by the handle and operable to move the locking bolt to the last mentioned position.

9. The combination with a cock device having a rotatable valve stem, a handle for rotating the valve stem and a stop adapted to be engaged by the handle to lock the handle against movement to rotate the valve stem, said handle being movable in one direction out of locking engagement with the stop, of a pivoted member adapted to engage said handle to prevent the handle from being moved out of locking engagement with the stop and movable to a position to permit the handle to be moved out of locking engagement with the stop and operable automatically to a position to engage the handle upon movement of the handle to engage the stop, and means associated with the handle for causing the pivoted member to move to the last mentioned position if when the handle is moved into engagement with the stop the pivoted member has a tendency to remain in position permitting the handle to be moved out of locking engagement with the stop.

10. The combination with a cock device having a rotatable valve stem, a handle for rotating the valve stem and a stop adapted to be engaged by the handle to lock the handle against movement to rotate the valve stem, said handle being movable in one direction out of locking engagement with the stop, of a pivoted member adapted to engage said handle to prevent the handle from being moved out of locking engagement with the stop and movable to a position to permit the handle to be moved out of locking engagement with the stop and operable automatically to a position to engage the handle upon movement of the handle to engage the stop, and means operable upon movement of the handle into locking engagement with the stop for positively moving the pivoted member into locking position with relation to the handle in the event of the failure of the pivoted member to move of itself to the last mentioned position upon movement of the handle to engage the stop.

11. The combination with a cock device having a rotatable valve stem, a handle for rotating the valve stem and a stop adapted to be engaged by the handle to lock the handle against movement to rotate the valve stem, said handle being movable in one direction out of locking engagement with the stop, of a pivoted member adapted to engage said handle to prevent the handle from being moved out of locking engagement with the stop and movable to a position to permit the handle to be moved out of locking engagement with the stop and operable automatically to a position to engage the handle upon movement of the handle to engage the stop, and means operable upon movement of the handle into locking engagement with the stop for positively moving the pivoted member into locking position with relation to the handle in the event of the failure of the pivoted member to move of itself to the last mentioned position upon movement of the handle to engage the stop and to maintain the pivoted member against pivotal vibration when the handle is in position engaging said stop.

12. The combination with a cock device having a rotatable valve stem, a member for rotating the valve stem, a stop, and a handle for rotating said member, said handle being pivotally mounted on said member and adapted to be moved pivotally downwardly into engagement with said stop to prevent the rotation of the member and adapted to be moved pivotally upwardly out of engagement with the stop to permit the rotation of the member, of a locking bolt mounted on said member adapted to prevent the handle from being moved upwardly out of engagement with said stop and movable to a position for permitting the handle to be moved upwardly out of engagement with the stop, and means carried by the handle for moving said locking bolt to the last mentioned position.

13. The combination with a cock device having a rotatable valve stem, a member for rotating the valve stem, a stop, and a handle for rotating said member, said handle being pivotally mounted on said member and adapted to be moved pivotally downwardly into engagement with said stop to prevent the rotation of the member and adapted to be moved pivotally upwardly out of engagement with the stop to permit the rotation of the member, of a locking bolt pivotally carried intermediate its ends on said member, one of the ends of the locking bolt being adapted to engage with the handle to prevent the handle from being moved upwardly out of locking engagement with said stop, means at the other end of the locking bolt for maintaining the locking bolt in locking position with relation to the handle when the handle is in its lower position, and means for rocking said locking bolt out of locking relation with the handle.

14. The combination with a cock device having a rotatable valve stem, a member for rotating the valve stem, a stop, and a handle for rotating said member, said handle being pivotally mounted on said member and adapted to be moved pivotally downwardly into engagement with said stop to prevent the rotation of the member and adapted to be moved pivotally upwardly out of engagement with the stop to permit the rotation of the member, of a locking bolt pivotally carried intermediate its ends on said member, one of the ends of the locking bolt being adapted to engage with the handle to prevent the handle from being moved upwardly out of locking engagement with said stop, means at the other end of the locking bolt for maintaining the locking bolt in locking position with relation to the handle when the handle is in its lower position, and key-controlled means rotatably mounted in the handle operable to rock said locking bolt out of locking relation with the handle.

15. The combination with a cock device having a rotatable valve stem, a handle for rotating the valve stem and a stop adapted to be engaged by the handle to lock the handle against movement to rotate the valve stem, said handle being movable in one direction out of locking engagement with the stop and being movable in the opposite direction into locking engagement with the stop, of means adapted to engage said handle to prevent the handle from being moved out of locking engagement with said stop and being movable to a position for permitting the handle to be moved out of locking engagement with the stop, key operated means associated with said handle for moving said means to the last mentioned position, said means being automatically movable to its handle engaging position upon movement of the handle into locking engagement with said stop, and means operable upon movement of the handle into locking engagement with said stop adapted to positively move the first mentioned means to the handle engaging position.

16. A cock device comprising a cock body, a valve stem rotatably mounted in said cock body and having a valve open position and a valve closed position, a handle pivotally mounted on said valve stem for rotating the valve stem, said handle being pivotally movable vertically to a raised position, a lug carried by said handle for engaging a portion of the cock body in the valve open position of the valve stem to prevent the rotation of the valve stem, means for locking said handle against movement to its raised position in the valve open position of the valve stem, means rotatably mounted in said handle for operating said means to permit the handle to be moved to its raised position, said lug being adapted to engage a portion of the cock body in the valve closed position of the valve stem to prevent vertical movement of the handle from its raised position, and means on the handle for maintaining the first mentioned means against movement to handle locked position when the handle is in its raised position.

17. A cock device comprising a cock body, a valve stem rotatably mounted in said cock body and having a valve open position and a valve closed position, a handle pivotally mounted on said valve stem for rotating the valve stem, said handle being pivotally movable vertically to a raised position, a lug carried by said handle for engaging a portion of the cock body in the valve open position of the valve stem to prevent the rotation of the valve stem, means for locking said handle against movement to its raised position in the valve open position of the valve stem, means carried by said handle for operating said means to permit the handle to be moved to its raised position, said lug being adapted to engage a portion of the cock body in the valve closed position of the valve stem to prevent vertical movement of the handle from its raised position, and means on the handle for maintaining the first mentioned means against movement to handle locked position when the handle is in its raised position.

CLYDE C. FARMER.